United States Patent [19]

Munro et al.

[11] 4,236,372
[45] Dec. 2, 1980

[54] AGRICULTURAL HARVESTING MACHINES WITH CROP PICK-UP MECHANISMS

[75] Inventors: James A. Munro, Aylesbury; Alan P. Lummis, Tring, both of England

[73] Assignee: Sperry Corporation, New Holland, Pa.

[21] Appl. No.: 70,297

[22] Filed: Aug. 28, 1979

[30] Foreign Application Priority Data

Sep. 5, 1978 [GB] United Kingdom ............... 35628/78

[51] Int. Cl.³ .......................................... A01D 39/00
[52] U.S. Cl. ....................................... 56/364; 56/15.8
[58] Field of Search .......................... 56/364, 341–343, 56/15.8

[56] References Cited

U.S. PATENT DOCUMENTS

| | | | |
|---|---|---|---|
| 2,414,823 | 1/1947 | Luebben | 56/364 |
| 3,684,026 | 8/1972 | Reuter et al. | 56/341 |
| 3,798,885 | 3/1974 | Glass et al. | 56/364 |
| 3,984,969 | 10/1976 | Yatcilla | 56/341 |

*Primary Examiner*—Jay N. Eskovitz
*Attorney, Agent, or Firm*—Frank A. Seemar; John B. Mitchell

[57] ABSTRACT

An agricultural harvesting machine comprises a frame, a crop pick-up mechanism mounted on the frame for flotational movement with respect thereto, and counterbalancing means operable to counterbalance at least a portion of the weight of the pick-up mechanism. The counterbalancing means comprise a combined sheave structure rotatably mounted on the frame and having a first sheave coaxial with the axis of rotation, and a second sheave connected for rotational movement with the first sheave and having a nonuniform radius relative to the axis of rotation, resilient means coupled between the frame and the sheave structure and first and second interconnecting means interconnecting the combined sheave structure with the pick-up means and the resilient means respectively. The first and second interconnecting means extend around the first and second sheave respectively of the combined sheave structure and the arrangement is such that as the sheave structure rotates, the moment about the axis of rotation of the sheave structure produced by the resilient means is always substantially equal to the moment about the same axis produced by the weight of the pick-up means irrespective of the position of the latter relative to the frame.

3 Claims, 4 Drawing Figures

AGRICULTURAL HARVESTING MACHINES WITH CROP PICK-UP MECHANISMS

BACKGROUND OF THE INVENTION

1. Field of the Invention

The present invention relates generally to agricultural harvesting machines with crop pick-up mechanisms and more particularly, is concerned with an improved system for counter-balancing the pick-up mechanisms of such machines.

The present invention has particular, but not exclusive, application to agricultural balers and has been conceived as an improvement over the baler disclosed and illustrated in U.S. Pat. No. 3,984,969. However, the invention has a wider application and may be embodied in any agricultural machine having a crop pick-up mechanism which term is intended to include the header of a combine harvester.

A baler typically comprises a mobile frame adapted to move across a field, means on the frame operable to receive crop material and form the material into bales, and a pick-up mechanism including pivot means on the frame and pick-up means disposed generally forwardly of the pivot means and operable to pick up crop material from the field and feed the material to the receiving and baling means. The pick-up means is connected to the pivot means for vertical swinging movement about the pivot means.

2. Description of the Prior Art

The prior art counterbalancing system disclosed in U.S. Pat. No. 3,984,969 includes a lever pivotally mounted on the frame for movement along a generally arcuate path about a generally horizontal pivot axis at a location above, and spaced from, one lateral side of the pick-up mechanism. The lever is pivotally arranged between a first, generally horizontally-extending position and another position at a substantial angle relative to the horizontal.

The counterbalancing means further include an elongated linkage interconnecting the pick-up mechanism at its one lateral side with the lever at a location spaced from its pivot, and resilient means mounted on the frame above the pick-up mechanism and acting upon the lever with a predetermined force adequate to counterbalance a substantial portion of the weight of the pick-up mechanism through the lever and interconnecting linkage and thereby floatingly to support the pick-up means in an operative position above the field.

The resilient means are disposed in relation to the pivot axis of the lever such that, during upward swinging movement of the pick-up mechanism about its pivot, which results in a generally upward movement of the lever along its arcuate path about its pivot axis, the moment arm of the counterbalancing force of the resilient means about the pivot axis of the lever increases as the magnitude of the counterbalancing force itself of the resilient means decreases. This tends to provide a substantially uniform flotation of the weight of the pick-up mechanism as it follows the contour of the field during movement of the baler across the field.

While this prior art system has, in an overall sense, proven to be a satisfactory way of counterbalancing the baler pick-up mechanism, some disadvantages have been discovered.

One disadvantage relates to the vertical displacement of the pick-up mechanism and the pivot lever. Both of these components move up and down in unison but not over identically the same height. As it is desirable to have the pick-up mechanism capable of flotation over a large range of pick-up movement, this means that the lever should also be movable over a large range. This in turn means that, on the one hand, the lever has to be relatively long and, on the other hand, a large space has to be provided to accommodate pivotal movement of the lever. This space is not always available in all baler designs.

Another disadvantage derives from the fact that the resilient means are working close to the pivot axis of the pivot lever which means that heavy and expensive resilient means are required which, moreover, heavily load the pivot of the lever and cause substantial frictional forces thereon. These heavy frictional forces result in fast wear on the one hand and a less smooth flotation on the other hand.

SUMMARY OF THE INVENTION

It is the object of the present invention to overcome or to attentuate one or more of the foregoing disadvantages.

According to the present invention an agricultural harvesting machine comprises a frame, a crop pick-up mechanism mounted on the frame for flotational movement with respect thereto, and counterbalancing means operable to counterbalance at least a portion of the weight of the pick-up mechanism, the counterbalancing means comprising a combined sheave structure rotatably mounted on the frame and having a first sheave coaxial with the axis of rotation, and a second sheave connected for rotational movement with the first sheave and having a non-uniform radius relative to the axis of rotation, resilient means coupled between the frame and the sheave structure, and first and second interconnecting means interconnecting the combined sheave structure with the pick-up means and the resilient means, respectively, the first and second interconnecting means extending around the first and second sheaves, respectively, of the combined sheave structure and the arrangement being such that as the sheave structure rotates, the moment about the axis of rotation of the sheave structure produced by the resilient means is always substantially equal to the moment about the same axis produced by the weight of the pick-up means irrespective of the position of the latter relative to the frame.

Counterbalancing means may be provided in association with either or both lateral sides of the pick-up mechanisms. The second sheave of the or each counterbalancing means is conveniently made circular and mounted eccentrically relative to the first sheave to provide the non-uniform radius relative to the axis of rotation. Alternatively, the second sheave may be non-circular and mounted either co-axially with or eccentric to the first sheave.

The combined sheave structure of the or each counterbalancing means is preferably rotatably mounted in substantially horizontal plane at a location generally vertically above the corresponding lateral side of the pick-up mechanism. The sheave structure preferably is made of synthetic plastics material such as polyacetal and is moulded in a single piece. The diameter of the first sheave may be in the range of 15–20 cms. with the diameter of the second sheave (when circular) in the range of 8–12 cms. When the first and second sheaves are mounted eccentrically relative to each other, the eccentricity may be in the range of 2-4 cms. in terms of the distance between their centres and preferably both sheaves are arranged such that the sheaves have a common tangent.

Each of the resilient means may be in the form of a tension spring acting on the associated combined sheave structure with a predetermined force adequate to counterbalance a substantial portion of the weight of the pick-up mechanism so as to afford flotation of the pick-up mechanism in an operating position above the field. Each spring may be coupled at one end to a threaded rod which is adjustably coupled to an appropriate support on the frame to provide adjustability of the counterbalancing force of the spring. Each spring is preferably arranged generally horizontally and transversely of the machine.

The first and second interconnecting means may be in the form of flexible structures such as cables or the like coupled to the combined sheave structure. The cables pass over at least a portion of the respective sheaves in opposite directions so that upon rotation of the sheaves, one cable is effectively shortened and the other cable lengthened.

The first cable may be coupled at one end to the pick-up mechanism forwardly of its pivotal mounting on the frame and also forwardly of the centre of gravity thereof. The first cable may also extend in a forward direction from the combined sheave structure and pass around a further sheave which is rotatably mounted on a generally transverse shaft. The further sheave is preferably mounted generally above and forwardly of the centre of gravity of the pick-up mechanism and hence the cable extends in a general vertical direction between the further sheave and the pick-up mechanism.

The second cable interconnects the tension spring and the second sheave of the combined sheave structure.

Preferably, the spring, the combined sheave structure and the second cable all are mounted on the frame above the pick-up means and extend generally transversely thereof. Also these components are mounted within a rigid transverse beam of the frame of the machine.

The resilient means is disposed in relation to the pick-up mechanism about pivot means which results in a rotation of the combined sheave structure, the moment arm of the counterbalancing force of the resilient means about the axis of rotation of the combined sheave structure increases as the magnitude of the counterbalancing force of the resilient means decreases, so as to provide a substantially uniform counterbalance of the weight of the pick-up mechanism as it follows the contour of the field during movement of the machine across the field.

BRIEF DESCRIPTION OF THE DRAWINGS

A baler constructed in accordance with the present invention will now be described in greater detail, by way of example, with reference to the accompanying drawings, in which.

DETAILED DESCRIPTION OF THE PREFERRED EMBODIMENT

In the following description, righ-hand and left-hand references are determined by standing at the rear of the baler and facing in the direction of forward travel. Also, it is to be understood in this specification that such terms as "forward," "rearward," "left," and "upwardly," are words of convenience and are not to be construed as limiting terms.

Figure 1:
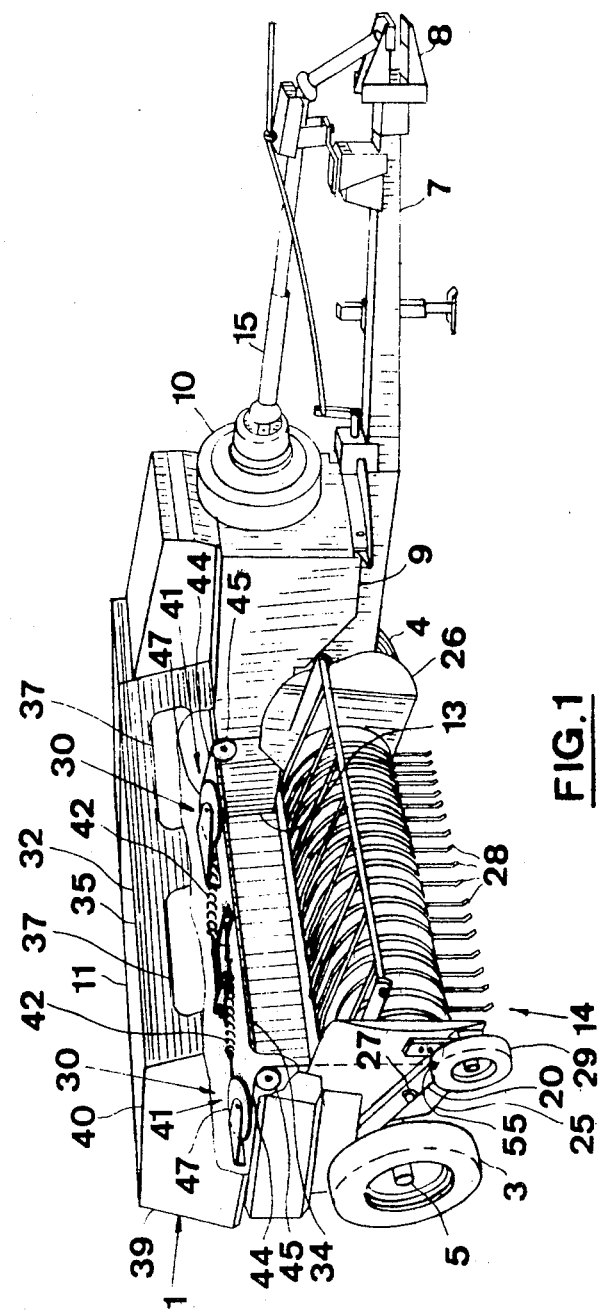
FIG. 1 is a perspective view of the baler with portions broken away to show a pair of pick-up counterbalancing means.

Referring now to the drawings, and particularly to FIG. 1, the baler is indicated generally at 1 and includes a frame 2 (best seen in FIG. 2) supported and made mobile by right-hand and left-hand ground engaging wheels 3, 4 rotatably mounted on respective spindles 5, 6 connected to, and extending outwardly from, respective opposite sides of the frame 2. The baler 1 has a tongue 7 pivotally connected to the frame 2 and extending forwardly of the baler, terminating in a hitch 8 which is connectible to the drawbar of a tractor so that the baler 1 may be towed across a field.

The baler 1 further includes a fore-and aft extending bale case or chamber 9 on the frame 2 having a forward end on which a flywheel 10 is rotatably mounted, a feed housing 11 mounted on the frame 2 transversely on the baler adjacent the right-hand side of the bale case 9 within which is mounted a feed mechanism 12 (FIG. 2) adapted to convey crop material into the bale chamber 9 through an inlet opening 13, and a pick-up mechanism 14 mounted on the frame 2 forwardly of and below the feed housing 11 and adapted to lift crop material from the field and deliver it to the feed mechanism 12.

A plunger (not shown) is mounted for reciprocable movement in the bale chamber 9 to form the crop material conveyed therein through inlet opening 13 into rectangular bales. As a bale is formed in the bale chamber 9, it moves progressively towards the rear end of the bale chamber 9 and when completed, it is banded with a suitable tying medium and subsequently discharged from the rear end of the bale chamber 9.

An input drive line, generally designated by numeral 15, is connected at its rear end to the baler flywheel 10 and is adapted for connection at its forward end to the power take-off (pto) shaft of the tractor (not shown) for rotation in unison therewith to supply rotary driving power to the operating components of the baler 1 through additional power transmitting components (not shown).

As mentioned above, disposed forwardly of and below the feed housing 11 of the baler 1 is the pick-up mechanism 14. The pick-up mechanism includes pivot means, indicated generally by 16 (FIG. 2), and pick-up means indicated generally by 17. The pivot means 16 includes a transversely-extending tubular member 18 which is rotatably journalled in spaced, downwardly-extending portions 19 (only the left-hand one being shown in FIGS. 2 and 3) of the baler frame 2. The pick-up means 17 includes right-hand and left-hand channel members 20, 21 which are secured at their respective rearward ends to the tubular member 18. A plurality of upwardly and downwardly extending pick-up guard supports 22, 23 are also secured at their rearward ends to the tubular member 18, the pick-up guard supports being disposed in spaced apart relationship between the channel members 20, 21. Spaced pick-up guards 24 are secured to the forward portion of each of the upper and lower pick-up guard supports 22, 23. Right-hand and left-hand pick-up side sheet members 25-26 are secured respectively to inner sides of the channel members 20, 21.

A tubular shaft 27 extends transversely between, and is rotatably journalled at its opposite ends in, the respective channel members 20 and 21 at locations generally intermediate their rearward and forward ends, the tubular shaft 27 supporting in a conventional manner a plurality of pick-up tines 28 which are aligned so as to extend outwardly through respective spaces between the pick-up guards 24 during rotation of the shaft 27. The tubular shaft 27 is rotated, and thereby the tines or fingers 28 moved, in a counterclockwise direction (as viewed in FIG. 2) by a generally conventional drive mechanism (not illustrated) which is one of the aforementioned power transmitting components powered from the baler drive-line 15.

Figure 2:
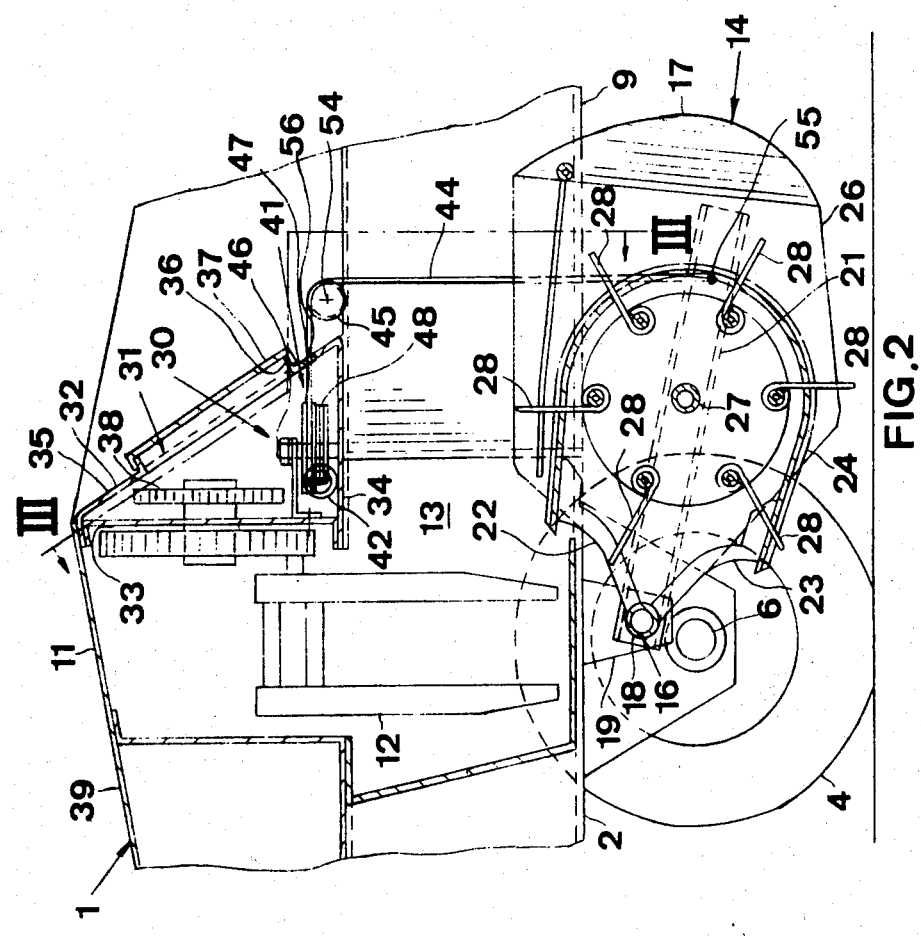
FIG. 2 is an enlarged, fragmentary side elevational view of the baler as seen from the middle of the baler pick-up mechanism looking toward the left-hand side of the baler, with some portions broken away.

In FIGS. 1 and 2, the pick-up means 17 is shown in its lowered, operating position for picking up crop material from the ground and feeding it to the feed housing 11 as the baler is towed across the field. In this position, the height of the pick-up means 17 above the field is gauged by a ground-engaging wheel 29 which is adjustably supported by the right-hand channel member 20.

As the baler 1 advances in a forward direction across the field, the rotating pick-up fingers 28 engage crop material lying on the ground and lift it upwardly and rearwardly towards the feed housing 11 as the gauge wheel 29 rides over the ground causing the pick-up means 17 to move vertically as uneven surface contours are encountered by the baler 1. In order to prevent too much force from being imposed upon the gauge wheel 29, it has been conventional practice to counterbalance a substantial portion of the weight of the pick-up means 17.

Figure 3:
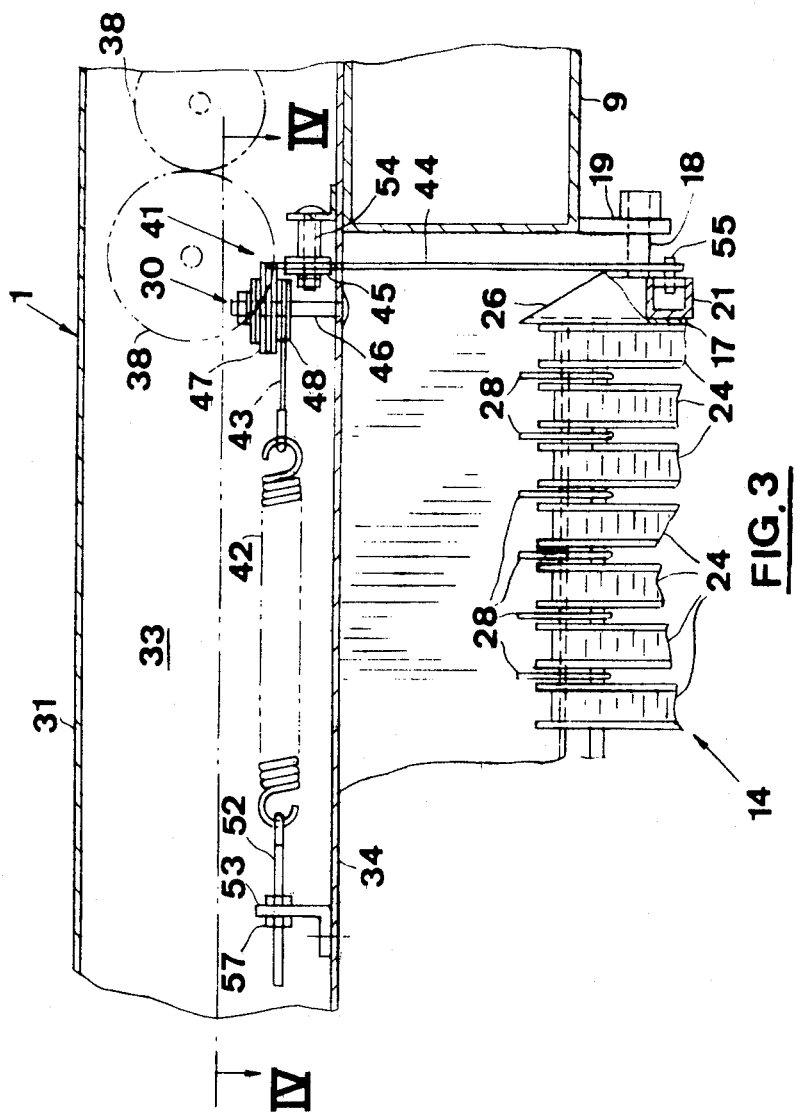
FIG. 3 is a schematic fragmentary front elevational view taken along the line III—III of FIG. 2, but on a larger scale.
Figure 4:
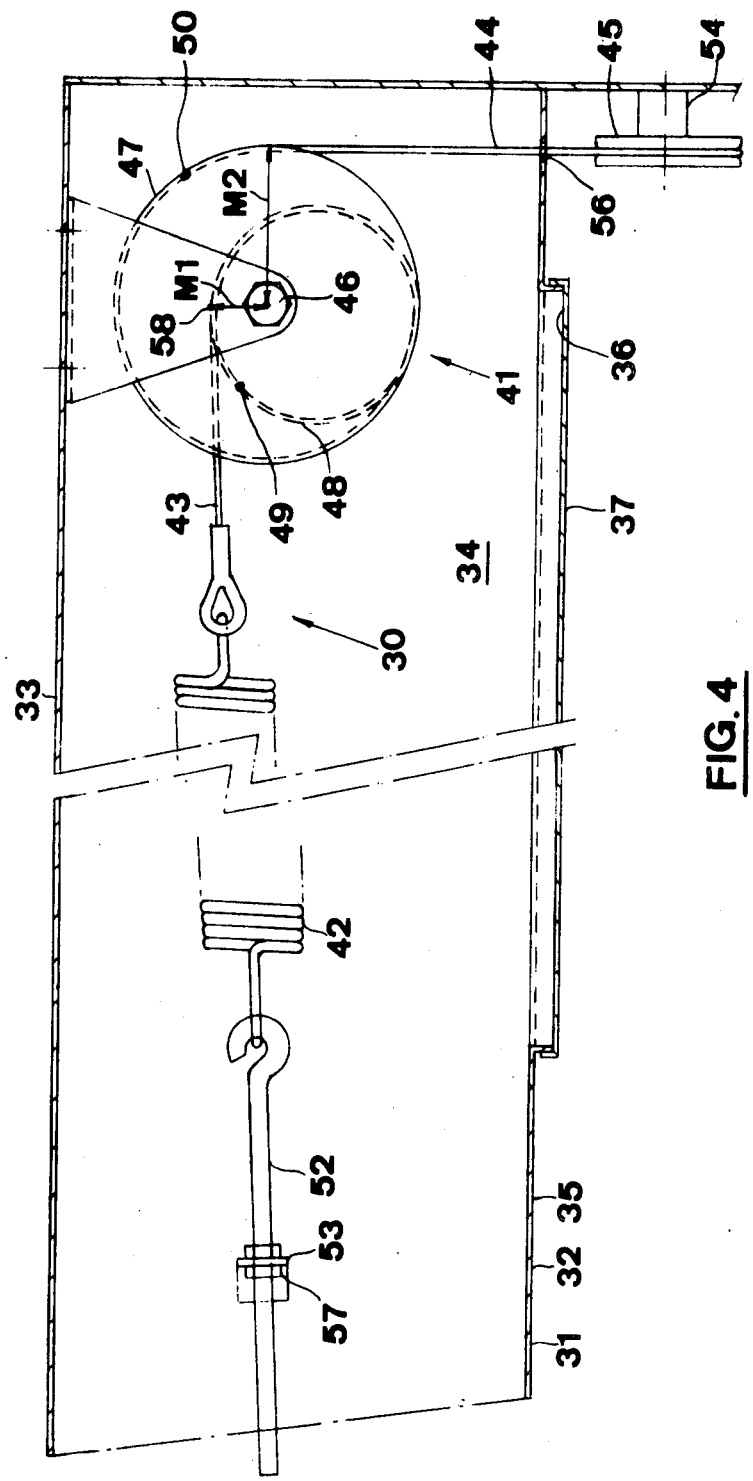
FIG. 4 is a fragmentary top view taken along line IV—IV of FIG. 3, but on a larger scale.

The improved counterbalancing means provided by the present invention are generally indicated at 30 and preferably located in association with the left-hand side of the pick-up means 17, as seen in FIGS. 2, 3 and 4. However, the counter-balancing means may alternatively be associated with the right-hand side of the pick-up means 17, or a pair of such improved counterbalancing means may be incorporated into a baler in association with both sides of the pick-up means 17 such as seen in FIG. 1.

The feed housing 11 is built on a rigid transverse beam 31 which itself is firmly secured to the top wall of the bale case 9 and which extends sideways and to the right thereof. The transverse beam 31 is generally triangular in cross section and is formed by first and second sheet metal members 32 and 33 firmly secured together at their opposite edges to form a so-called monocoque cell. The first member 32 is formed by a single sheet metal formed so as to define a lower, generally horizontally extending wall portion 34 and an upwardly and rearwardly inclined wall portion 35. The latter portion 35 forms the top front wall of the feed housing 11 and comprises a number of elongate access openings 36 which can be closed by detachable covers 37. The second sheet metal member 33 is formed by a generally vertically extending wall having flanged edges for attachment to the corresponding edges of the first member 32. This second sheet metal member 33 supports, via suitable bearing means, the feed mechanism 12 and the drive means 38 therefor at opposite sides thereof. The drive means 38 are positioned within the rigid transverse beam 31 as can be best seen from FIG. 2. The drive means 38 can be reached for service through the access openings 36 in the front wall 35. An end plate 40 forming a side wall of the feed housing 11 is secured to the extreme right-hand end of the beam 31. As indicated above, the feed housing 11 is mounted on the rigid beam 31 and comprises a number of wall sections, generally indicated at 39.

The improved counterbalancing means 30 basically comprises a combined sheave structure 41, resilient means in the form of a tension spring 42, interconnecting means in the form of a pair of cables 43 and 44 or the like, and a further sheave 45. The combined sheave structure 41, the spring 42 and the cable 43 are disposed within the transverse rigid beam 31 at a location generally above the lower horizontal wall portion 34 thereof and generally parallel therewith.

The combined sheave structure 41 is preferably made of synthetic material such as polyacetal and is moulded in a single piece. The structure 41 is rotatably mounted on an upright stub shaft 46 on the bottom wall 34 of the rigid beam 31 and adjacent its inner end, i.e. adjacent the side wall of the bale case 9 facing the pick-up means 17. The structure 41 comprises a first sheave 47 of a certain diameter (e.g. in the range of 15 to 20 cm) and mounted coaxially with the stub shaft 46, and a second sheave 48 of a smaller diameter (e.g. in the range of 8 to 12 cm). The sheave 48 is arranged eccentric relative to the stub shaft 46 and the first sheave 48, and the eccentricity may be in the range of 2 to 4 cm. in terms of the distance between the centres of the sheaves 46 and 47. The eccentricity preferably is such that the sheaves 46 and 47 have a common tangent at one particular point.

Fixation means 49, 50 for the respective cables 43 and 44 are provided on the outer circumferences of the respective sheaves 48 and 47. The cable 43 passes from the fixation means 49 on the sheave 48 in a counter-clockwise direction, as seen in FIG. 4, around that sheave and is attached at its other end to the tension spring 42. The spring 42 is attached at its opposite end to a threaded rod 52 adjustably secured in a mounting bracket 53 on the bottom wall 34 of the transverse rigid beam 31. The spring 42, the cable 43 and the sheaves 47, 48 are all positioned in a horizontal plane and are displaced in that plane during the counterbalancing operation so that only a minimal height is required to house these components. Furthermore, and as will become clear hereinafter, no major displacements of the aforementioned components will occur in the horizontal direction for a major adjustment of the position of the pick-up means 17 in a vertical direction, so that in the horizontal direction minimal space is also required to house these components.

The cable 44 is secured to the sheave 47 by the fixation means 50 and extends in a clockwise direction, as seen in FIG. 4, around that sheave 47 and then extends forwardly of the baler before passing around the further sheave 45 which is rotatably mounted on a stub shaft 54 on the right-hand side wall of the bale case 9 and is coupled at its other end to a pin 55 on the left-hand channel member 21 of the pick up means 17. The stub shaft 54 extends generally horizontally and in a transverse direction and is positioned substantially vertically above the mounting pin 55 on the pick up means 17 so that the cable 44 has a substantially vertically extending portion. The further sheave 45 is mounted forwardly of the transverse rigid beam 31 and has its upper end substantially at the same level as the combined sheave structure 41, whereby the cable 44 thus has an intermediate section which extends generally horizontally in a fore-and-aft direction. An aperture 56 is provided in the front wall portion 35 of the rigid beam 31 for the passage therethrough of the cable 44. The pin 55 is secured to the left-hand channel member 21 forwardly of the left-hand end of the tubular shaft 27.

By tightening the nut 57, the tension, and hence the magnitude of the counterbalancing force, provided by the spring 42 is increased.

OPERATION

In operation, the baler 1 is moved across a field containing crop to be baled in an offset relationship to the pulling tractor in a manner so that the pick-up means 17 are aligned with a crop windrow. All operating components are driven through the input drive line 15 and the pick-up means 17 are brought to their lowered, operative position with the gauge wheel 29 contacting the ground surface. The ground pressure of the gauge wheel 29 is minimal as a major portion of the weight of the pick-up means 17 is counterbalanced by the counterbalancing means 30.

As the baler 1 is pulled over the field, the pick-up means 17 moves up and down about the pivot means 16 to float over and follow the contour of the ground surface. Due to the arrangement of the spring 42, the cables 43 and 44 and their attachments to the sheaves 47 and 48, as well as the sheaves 47 and 48 themselves, the pick-up means can move vertically through a distance which is substantially greater than the length of the maximum deflection or movement of the spring 42.

The combined sheave structure 41 as shown in FIG. 4 is substantially in a position corresponding to the lowermost position of the pick-up means 17 and it will be noted that in this position the first point of contact 58 of the cable 43 with the periphery of the sheave 48 as it comes from the spring 42 is that which is closest to the axis of rotation of the sheave structure 41. Thus the moment arm M1 is at a minimum whilst the force exerted by the spring 42 is at a maximum. The moment thus produced by the spring 42 about the rotational axis of the sheave structure equals that produced by the weight of the pick-up mechanism 14 acting through the moment arm M2 associated with the sheave 47. If the pick-up means 17 rises to follow the ground contour, the springs 42 contracts and causes the combined sheave structure 41 to rotate in a counterclockwise direction as seen in FIG. 4. This has no effect on the length of the moment arm M2 but the moment arm M1 increases due to the eccentricity of the sheave 46 relative to the stub shaft 46 and the rotational movement therearound caused by the contracting spring 42. Thus the moment arm M1 of the counter-balancing force of the spring 42 about the stub shaft 46 increases as the magnitude of the counterbalancing force decreases due to the contraction thereof. The arrangement is such that the moment produced by the spring is substantially constant whatever the orientation of the sheave structure 41 and the effective length of the spring 42. Thus a substantially uniform flotation of a substantial portion of the weight of the pick-up means 17 as it follows the contour of the field during the movement of the baler 1 across the field is achieved.

It will be appreciated that when the pick-up 14 falls to its nominal working position, the resulting pull on the cable 44 rotates the sheave structure 41 in a clockwise direction, as seen in FIG. 4, whereupon the spring 42 is extended to increase the force exerted thereby but the moment arm M1 is decreased so that again, the counterbalancing force of the spring 42 remains substantially constant.

It will be readily apparent that should the frictional forces of the combined sheave structure 41 and the further sheave 45 on the respective stub shafts 46, 54 be excessive, then appropriate bearings may be provided to reduce this friction. It will also be readily apparent that, whilst in the foregoing description only counterbalancing means in association with the left-hand side of the pick-up means have been described, either similar counterbalancing means may be provided in association with the right-hand side of the pick-up means, or, as is shown in FIG. 1 and is preferred, counterbalancing means may be provided in association with both sides of the pick-up means.

From what precedes, it will be clear that counterbalancing means 30 are provided which require only a minimal height so that these means can easily be incorporated in any design of baler. Also the space taken in the horizontal direction is relatively small since a given vertical lift of the pick-up means 14 is accompanied merely by rotation of the combined sheave structure 41 and a contraction of the spring 42. Furthermore, the components of the counterbalancing means 30 are relatively small, very simple in design and inexpensive to manufacture.

In operation, the moment arm M1 of the counterbalancing force may be doubled while the length of the spring 42 does not vary considerably. This means that a high rate spring, in other words a fairly short spring 42 may be provided, and still obtain a counterbalancing torque which remains substantially constant.

Practice has shown that springs may be provided which are substantially lighter than those required in the described prior art, on the one hand, whilst on the other hand, a still more even counterbalancing force over the full range of flotation and a better control on the transmission and adjustment of the counterbalancing torque is obtained.

It will be understood that the eccentric sheave 48 may be other than circular to provide the necessary variation in the moment arm M1 as the force of the spring 42 changes although a circular sheave has proved satisfactory.

From the foregoing it will be seen that in order to provide uniform flotation of the pick-up mechanism 14, compensation for the change in the force exerted by the spring or springs 42 due to movement of the pick-up mechanism relative to the frame 2 has to be effected. This compensation is achieved by adjusting the length of the moment arm M1 which can be achieved either by a circular sheave 48 mounted eccentrically with respect to the axis of rotation of the sheave structure 41, or by a non-circular sheave which may be coaxial with, or eccentric to, said rotational axis. In each case, the sheave 48 is given a non-uniform radius and is positioned such that the desired change in the moment arm M1 is achieved.

Having thus described the invention, what is claimed is:

1. An agricultural harvesting machine comprising a frame, a crop pick-up mechanism mounted on the frame for flotational movement with respect thereto, and counterbalancing means operable to counterbalance at least a portion of the weight of the pick-up mechanism, the counterbalancing means comprising a combined sheave structure rotatably mounted on the frame and having a first sheave coaxial with the axis of rotation, and a second sheave connected for rotational movement with the first sheave and having a non-uniform radius relative to the axis of rotation, resilient means coupled between the frame and the sheave structure, and first and second interconnecting means interconnecting the combined sheave structure with the pick-up means and the resilient means, respectively, the first and second interconnecting means extending around the first and second sheaves, respectively, of the combined sheave structure and the arrangement being such that as the sheave structure rotates, the moment about the axis of rotation of the sheave structure produced by the resilient means is always substantially equal to the moment about the same axis produced by the weight of the pick-up means irrespective of the position of the latter relative to the frame.

2. A machine according to claim 1, wherein the counter-balancing means are provided in association with one of the lateral sides of the pick-up mechanism.

3. A machine according to claim 1, wherein a pair of counter-balancing means is provided, each of which is associated with one of the lateral sides of the pick-up mechanism.

* * * * *